(12) United States Patent
Tan et al.

(10) Patent No.: US 8,370,591 B2
(45) Date of Patent: Feb. 5, 2013

(54) METHOD AND APPARATUS FOR AUTOMATIC SNAPSHOT

(75) Inventors: Zujing Tan, Chengdu (CN); Peng Zhang, Chengdu (CN); Weihua Geng, Chengdu (CN); Guobin Zhang, Chengdu (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 472 days.

(21) Appl. No.: 12/540,962

(22) Filed: Aug. 13, 2009

(65) Prior Publication Data

US 2010/0049932 A1 Feb. 25, 2010

(30) Foreign Application Priority Data

Aug. 19, 2008 (CN) .......................... 2008 1 0147479

(51) Int. Cl.
*G06F 12/00* (2006.01)
*G06F 11/00* (2006.01)

(52) U.S. Cl. ................ 711/162; 711/209; 711/E12.103; 714/15; 714/E11.021

(58) Field of Classification Search .................. None
See application file for complete search history.

(56) References Cited

U.S. PATENT DOCUMENTS

| | | | | |
|---|---|---|---|---|
| 5,369,757 A * | 11/1994 | Spiro et al. | ...................... | 714/19 |
| 5,649,152 A | 7/1997 | Ohran et al. | | |
| 5,655,147 A * | 8/1997 | Stuber et al. | ...................... | 710/7 |
| 5,701,480 A * | 12/1997 | Raz | ................. | 714/19 |
| 6,332,177 B1 * | 12/2001 | Humlicek | ..................... | 711/114 |
| 6,978,280 B1 * | 12/2005 | Cochran et al. | ............... | 707/674 |
| 7,028,172 B2 * | 4/2006 | Levidow et al. | ................ | 714/24 |
| 7,177,935 B2 * | 2/2007 | Bradshaw et al. | ............ | 709/226 |
| 7,370,235 B1 * | 5/2008 | Gulve et al. | ...................... | 714/20 |
| 7,395,378 B1 * | 7/2008 | Pendharkar et al. | .......... | 711/144 |
| 7,401,251 B1 * | 7/2008 | Haynes et al. | ............... | 714/5.11 |
| 7,676,510 B1 * | 3/2010 | Karinta | ........................ | 707/654 |

(Continued)

FOREIGN PATENT DOCUMENTS

CN 101241456 A 8/2008
JP 10333839 A 12/1998

(Continued)

OTHER PUBLICATIONS

1st Office Action in corresponding Chinese Application No. 200810147479.6 (Jan. 15, 2010).

(Continued)

*Primary Examiner* — Jasmine Song
*Assistant Examiner* — Daniel Bernard
(74) *Attorney, Agent, or Firm* — Leydig, Voit & Mayer, Ltd.

(57) ABSTRACT

A method for automatic snapshot includes obtaining the amount of data written into a source Logical Unit Number (LUN) and performing increment accumulation; and taking a snapshot when a value of the increment accumulation exceeds the upper limit value. An apparatus for automatic snapshot is disclosed. In one embodiment of the invention, snapshots are taken according to the size of a data variable, only two characterizing parameters, an upper limit value and an increment value need to be added, and the determination logic is clear and concise. Thus, system efficiency or resource overload is not affected, the pertinence is strengthened, the resource usage is increased, and the adaptability is strengthened. Furthermore, stored data may be automatically protected with snapshot, and data safety and reliability are greatly improved.

14 Claims, 3 Drawing Sheets

U.S. PATENT DOCUMENTS

| | | | |
|---|---|---|---|
| 7,890,953 B2 * | 2/2011 | Li et al. | 718/100 |
| 8,095,938 B1 * | 1/2012 | Xie et al. | 719/318 |
| 2001/0056525 A1 * | 12/2001 | Selkirk et al. | 711/203 |
| 2003/0084276 A1 * | 5/2003 | Levidow et al. | 713/1 |
| 2003/0177306 A1 * | 9/2003 | Cochran et al. | 711/114 |
| 2004/0088314 A1 * | 5/2004 | Simes | 707/102 |
| 2005/0097132 A1 * | 5/2005 | Cochran et al. | 707/104.1 |
| 2006/0047931 A1 * | 3/2006 | Saika | 711/162 |
| 2007/0168518 A1 * | 7/2007 | McCabe et al. | 709/226 |
| 2009/0049261 A1 * | 2/2009 | Duchesne | 711/162 |
| 2009/0222499 A1 * | 9/2009 | Tan et al. | 707/674 |
| 2009/0265520 A1 * | 10/2009 | Geng et al. | 711/162 |
| 2010/0042802 A1 * | 2/2010 | Helman et al. | 711/173 |
| 2010/0106688 A1 * | 4/2010 | Higuchi et al. | 707/640 |

FOREIGN PATENT DOCUMENTS

| | | |
|---|---|---|
| JP | 2005235058 A | 9/2005 |
| JP | 2006163729 A | 6/2006 |
| JP | 2006302015 A | 11/2006 |
| JP | 2007280323 A | 10/2007 |
| JP | 2009266210 A | 11/2009 |

OTHER PUBLICATIONS

Rejection Decision in corresponding Chinese Application No. 200810147479.6 (Dec. 15, 2010).

Office Action in corresponding Japanese Application No. 2009-188837 (Jan. 1, 2012).

* cited by examiner

METHOD AND APPARATUS FOR AUTOMATIC SNAPSHOT

CROSS-REFERENCE TO RELATED APPLICATION

This application claims priority to Chinese Patent Application No. 200810147479.6, filed on Aug. 19, 2008, which is incorporated by reference herein its entirety.

FIELD OF THE INVENTION

The disclosed embodiments relate to the field of communication technology, and more particularly, to a method and an apparatus for automatic snapshot.

BACKGROUND

With the rapid increase of the amount of information, the amount of data stored in storage systems increases significantly. Service developments also impose higher requirements upon data processing technologies with respect to availability, reliability and expandability, in which data safety is of particular importance. The existing major technologies used for data protection include making backups and taking snapshots of the data. A snapshot is a completely usable copy taken from a data object. The copy includes an image of the data object at a certain time instant. Currently, there are three major snapshot technologies: Virtual Snapshot, Split Imaging and Copying on Demand.

With a snapshot technology, data stored in a source Logical Unit Number (LUN) may be obtained at an instant and occupies a small storage space. Snapshot technologies are relatively mature for the real time protection of data. There are three snapshot technologies in use currently. One is taking snapshots manually by a user. Another one is taking snapshots in connection with other operations (LUN copying, remote imaging). A further one is to take timed snapshot. In the three snapshot technologies, timed snapshot technology is one with which snapshots of a specified source LUN are taken automatically by the system in a certain time interval.

It is found by the inventor in the realization of the present invention that the related art technologies have the following defects:

The existing mode for the usage of automatic snapshot has only a single technology of timed snapshot, i.e. snapshot periodically: the snapshot for the current time instant is automatically taken by the system in a specified time period. The mode of automatic snapshot invocation has only a timed mode, which is relatively singular, and has limitations in some cases. For example, snapshots may still be taken for data even when no or little change is made to the data in the time period, causing unnecessary wasting of system resources.

SUMMARY

A method and an apparatus for automatic snapshot are provided in the embodiments of the invention. Snapshot is initiated based on the data variable in order to decrease unnecessary resource overload and improve the efficiency of the system.

The method for automatic snapshot includes: obtaining the amount of data written into a source LUN and performing increment accumulation; and taking a snapshot when a value of the increment accumulation exceeds an upper limit value.

The apparatus for automatic snapshot includes: an increment accumulation unit, configured to obtain an amount of data written into a LUN and perform increment accumulation; a determination unit, configured to determine whether a value of the increment accumulation exceeds an upper limit value; and a snapshot unit, configured to take a snapshot when the value of the increment accumulation exceeds the upper limit value.

In one embodiment of the invention, snapshots are taken according to the size of the data variable, only two characterizing parameters, an upper limit value and an increment value need to be added, and the determination logic is clear and concise. Thus, system efficiency or resource overload is not affected, the pertinence is strengthened, the resource usage is increased, and the adaptability is strengthened. Furthermore, stored data may be automatically protected with snapshot, and data safety and reliability are greatly improved.

BRIEF DESCRIPTION OF THE DRAWINGS

The foregoing summary, as well as the following detailed description of the disclosed embodiments, will be better understood when read in conjunction with the appended drawings. For the purpose of illustrating the disclosed embodiments, there are shown in the drawings that are presently preferred. It should be understood however, that the embodiments are not limited to the precise arrangement and instrumentalities shown.

DETAILED DESCRIPTION

The invention will be described in detail with figures and embodiments, in order to make the purposes, the technical solutions and the advantages of the invention more obvious. It should be understood that the embodiments are provided here only for the purpose of description. They are not intended to limit the scope of the invention.

An embodiment of the invention provides a method for automatic snapshot. An upper limit value is preset for the variable of data written into the source LUN, and the amount of data written into the source LUN each time is accumulated. If the accumulated value exceeds the preset upper limit value, a snapshot is taken, and the accumulation statistics is restarted. The specific process includes: a step of initialization for quantitative snapshot and a step of automatic snapshot according to variable. A process of taking a virtual snapshot is taken as an example in an embodiment of the invention.

Figure 1:
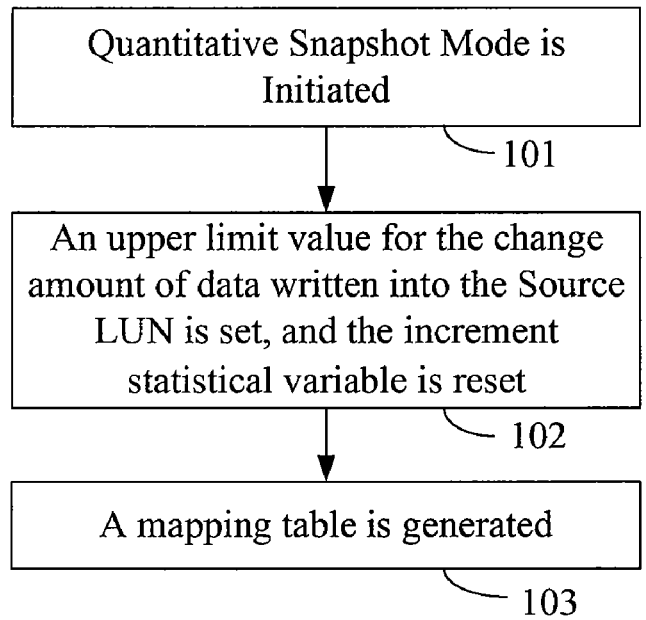
FIG. 1 is a flowchart illustrating an initialization process for quantitative snapshot according to one embodiment of the invention.

The initialization process of quantitative snapshot is shown in FIG. 1 which includes the following steps.

Block 101: A user issues a command for taking quantitative snapshots automatically to start the mode of quantitative snapshot.

Block 102: The user sets an upper limit value for the variable of data written into the source LUN, and initializes the increment statistical variable (the value of the accumulated increment) to reset the increment accumulation variable.

Figure 2:
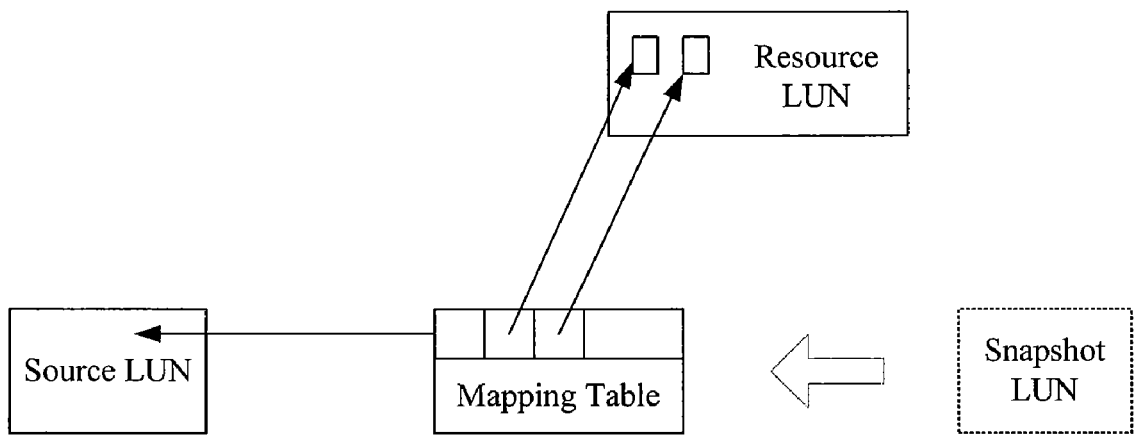
FIG. 2 is a diagram illustrating an initial state of virtual snapshot according to one embodiment of the invention.
Figure 3:
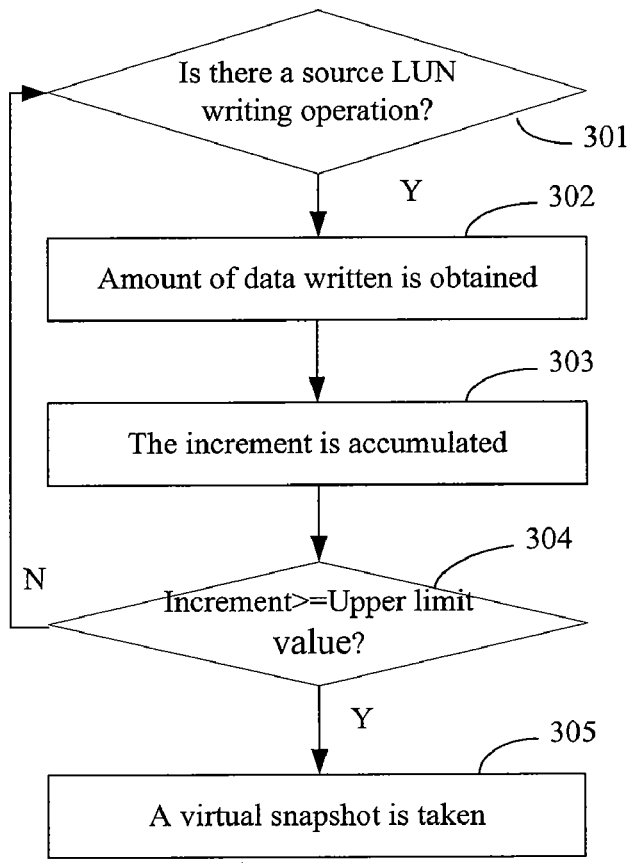
FIG. 3 is a flowchart illustrating a process of automatic snapshot according to variable in one embodiment of the invention.
Figure 4:
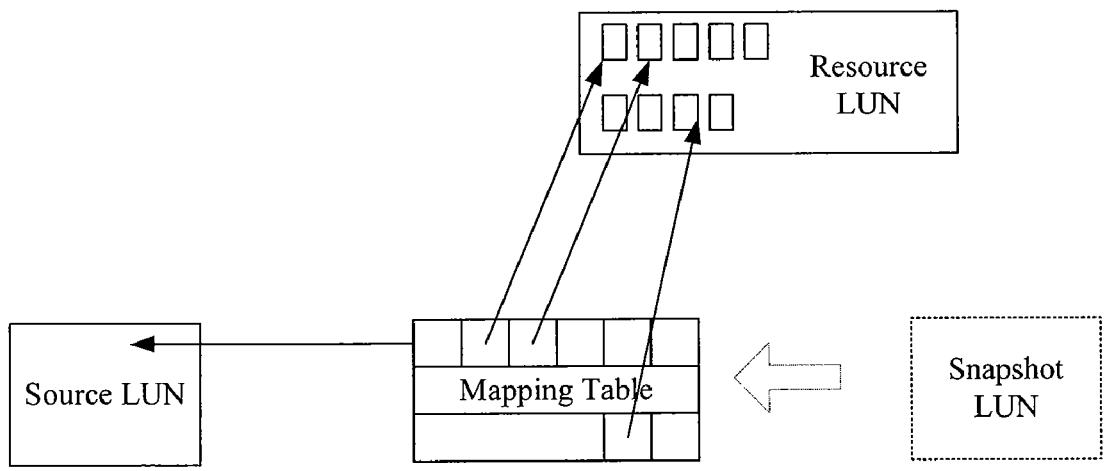
FIG. 4 is a diagram illustrating a process of performing copy-on-write for virtual snapshot according to one embodiment of the invention.

Block 103: A mapping table is generated for storing the locations where the snapshot data is stored. The storage locations are pointers pointing to the first addresses of data. The data in the source LUN and resource LUN is all stored in the form of data blocks. Each data block has a first address. A block of data corresponding to a first address may be read out when a pointer in the mapping table points to the first address. When in the initial state of virtual snapshot, the mapping table is as shown in FIG. 2, in which all the pointers in the mapping table point to the first addresses of data blocks in the source LUN. When copy-on-write is performed for the virtual snapshot, the mapping table is as shown in FIG. 4. A part of the pointers in the mapping table point to first addresses of data blocks in the source LUN (this part of data blocks are not copied). Another part of the pointers in the mapping table point to the addresses of the data blocks in the resource LUN (this part of data blocks have been subject to writing operation, and the original data blocks before the writing operation are copied into the resource LUN). The process of automatic snapshot according to variable includes the following steps as shown in FIG. 3.

Block 301: It is determined whether there is an operation of writing to the source LUN.

Block 302: If there is an operation of writing to the source LUN, the amount of data written is obtained.

Block 303: The amount of input data for each writing operation to the source LUN is subject to increment accumulation, and the total variable is obtained which is the total amount of input data obtained by accumulating the data amount input each time.

Block 304: It is determined whether the total variable exceeds the upper limit value preset in block 102 for the variable of data written into the source LUN. If the upper limit value is not exceeded, the process proceeds to block 301. If the upper limit value is exceeded, the process proceeds to block 305.

Block 305: If the upper limit value is exceeded, a snapshot is taken, and the change of increment is re-monitored.

The process of virtual snapshot is shown in FIG. 4.

Specifically, an operation of copy-on-write is performed. All the data blocks which are involved in the writing operation to the source LUN are copied to the resource LUN before the writing operation (the resource LUN is a backup of the source LUN, and plays the same role as the source LUN does, i.e. is also used for storing data). If a data block which has been subject to coping-before-writing is modified again, no more operation of copy-on-write is performed for it.

The mapping table is modified. The pointers involved in the writing operation to the source LUN are modified to point to the first addresses of the data blocks stored in the resource LUN which are copied from the source LUN.

A writing operation is performed to the source LUN. All the data involved in the writing operation to the source LUN is written into corresponding locations in the source LUN.

When the snapshot is read, data is read from the corresponding locations in the source LUN and resource LUN according to pointer information in the mapping table.

Figure 5:
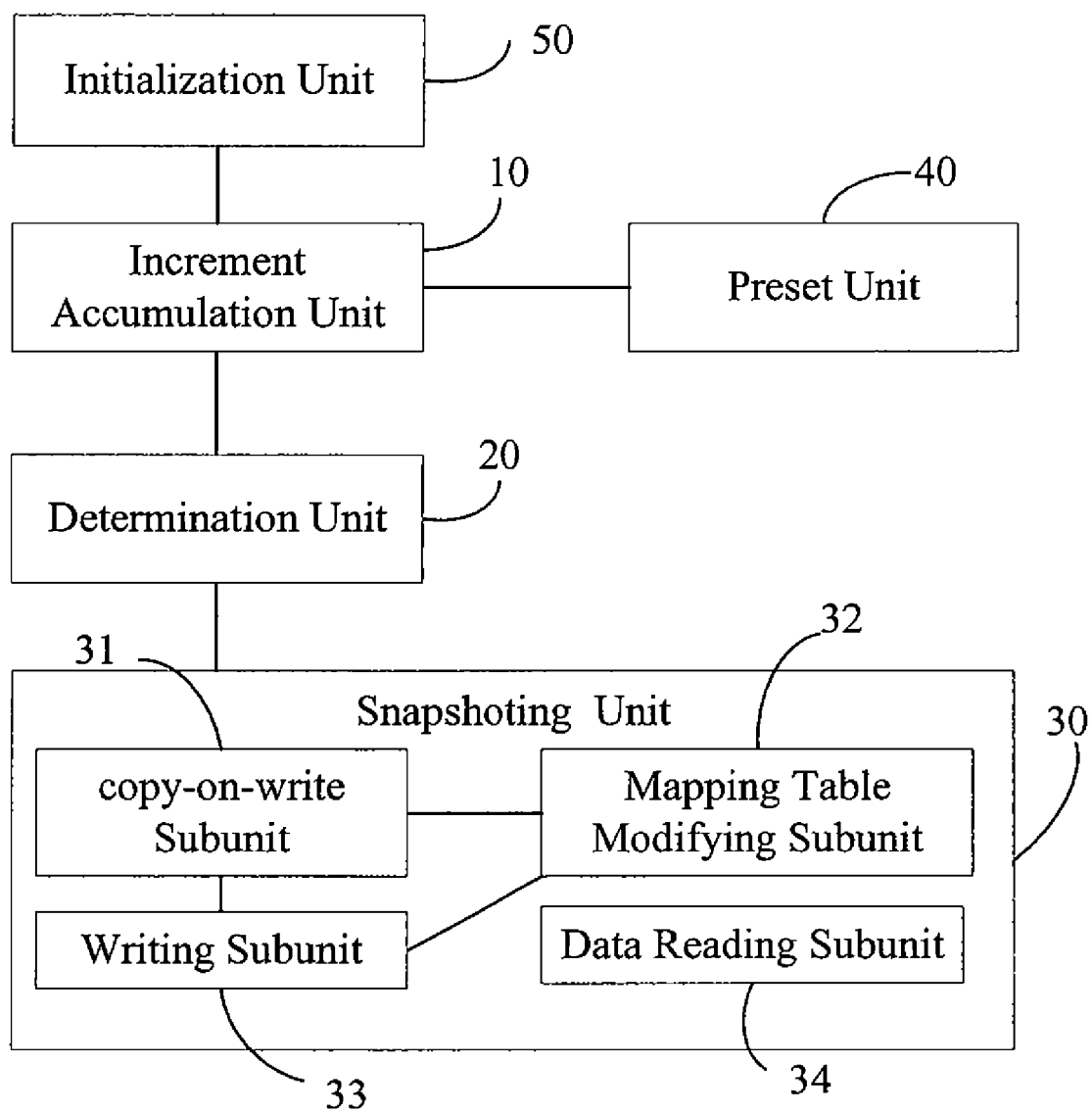
FIG. 5 is a block diagram of an automatic snapshot apparatus according to one embodiment of the invention.

An apparatus for automatic snapshot is provided according to one embodiment of the invention. As shown in FIG. 5, the apparatus includes an increment accumulation unit 10 configured to obtain the amount of data written into the LUN, and perform increment accumulation. The apparatus includes a determination unit 20 configured to determine whether a value of the increment accumulation exceeds an upper limit value value. The apparatus further includes a snapshot unit 30 configured to take a snapshot when the determination unit 20 determines that the value of the increment accumulation exceeds the upper limit value. The apparatus further includes an increment accumulation preset unit 40 configured to preset the upper limit value written into the source LUN and initialize the increment accumulation variable. The apparatus further includes an initialization unit 50 configured to generate a mapping table to store the actual storage locations of the actual data of the snapshot data. The mapping table pointers point to the source LUN.

The snapshot unit 30 includes: a copy-on-write subunit 31, configured to copy all the data blocks involved in the writing operation to the source LUN into the resource LUN; a mapping table modifying subunit 32, configured to modify the pointers involved in the writing operation to the source LUN to point to the first addresses where the data blocks corresponding to the source LUN writing operation are stored; and a writing subunit 33, configured to write all the data involved in the writing operation to the source LUN into the corresponding locations in the source LUN.

The snapshot unit 30 further includes: a data reading subunit 34, configured to read data from the source LUN and the resource LUN according to pointer information in the mapping table when the snapshot is read.

In one embodiment of the invention, the mode of automatically and quantitatively initiating a feature may be applied in the features of split imaging, remote imaging or LUN copying. For example, when it is used in the feature of automatic variable synchronization, when the variable in the bitmap of the source LUN reaches 50% and the user does not synchronize to the resource LUN, the system achieves an automatic synchronization.

In one embodiment of the invention, the automatic snapshot is applied in conjunction with synchronization. After the taking of the snapshot, the data increment is synchronized to a slave device to realize redundant backing-up and greatly improve data safety and reliability.

In one embodiment of the invention, snapshots are taken according to the size of the data variable, only two characterizing parameters, an upper limit value and an increment value, need to be added, and the determination logic is clear and concise. Thus, system efficiency or resource overload is not affected, the pertinence is strengthened, the resource usage is increased, and the adaptability is strengthened. Furthermore, stored data may be automatically protected with snapshot, and data safety and reliability are greatly improved.

It is apparent to the person skilled in the art that the invention may be realized by means of software, hardware or both of them. Software may be stored in a storage medium, and includes instructions for a computing device to realize the methods described in embodiments of the invention. The computing devices may be a personal computer, a server, or a network device, etc.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded with the widest scope consistent with the principles and novel features disclosed here.

What is claimed is:

1. A method for automatic snapshot, comprising:
resetting an increment accumulation variable which indicates a total amount of data written to a source Logical Unit Number (LUN), to zero;
after resetting the increment accumulation variable to zero, determining whether there is an operation of writing to the source LUN;
obtaining an amount of data which is written to the source LUN in the operation if the operation of writing to the source LUN is determined, wherein the amount of the data is a value indicating the number of bytes of the data which is written to the source LUN in the operation;
accumulating the number of bytes of the data which is written to the source LUN in the operation for the increment accumulation variable;
obtaining the total amount of data written to the source LUN;
determining whether the total amount of data written to the source LUN exceeds a preset upper limit value;
taking a snapshot upon determining that the total amount of data written to the source LUN exceeds the preset upper limit value, and reset the increment accumulation variable to zero again; and
determining whether there is another operation of writing to the source LUN on determining that the total amount of data written to the source LUN does not exceed the preset upper limit value.

2. The method for automatic snapshot according to claim 1, further comprising:
presetting the upper limit value of data written to the source LUN.

3. The method for automatic snapshot according to claim 1, before obtaining the amount of data which is written to the source LUN in the operation, further comprising:
generating a mapping table for storing locations where actual snapshot data is stored, wherein a pointer of the mapping table points to the source LUN.

4. The method for automatic snapshot according to claim 3, wherein taking the snapshot comprises:
copying all data blocks involved in the writing operation to the source LUN to a resource LUN;
modifying the pointer involved in the writing operation to the source LUN to point to first addresses of corresponding data blocks stored in the resource LUN; and
writing all the data involved in the writing operation to the source LUN into locations corresponding to the source LUN.

5. The method for automatic snapshot according to claim 4, after taking the snapshot, further comprising:
reading data from the source LUN and the resource LUN according to pointer information in the mapping table when the snapshot is read.

6. An apparatus for automatic snapshot, comprising a processor coupled to a memory and configured to:
preset an upper limit value of data written to a source Logical Unit Number (LUN);
reset an increment accumulation variable which indicates a total amount of data written to the source LUN, to zero;
after resetting the increment accumulation variable to zero, determine whether there is an operation of writing to the source LUN;
obtain an amount of data which is written to the source LUN if the operation of writing to the source LUN is determined, wherein the amount of the data is a value indicating the number of bytes of the data which is written to the source LUN in the operation;
accumulate the number of bytes of the data which is written to the source LUN in the operation for the increment accumulation variable;
obtain the total amount of data written to the source LUN;
determine whether the total amount of data exceeds the preset upper limit value;
take a snapshot upon determining that the total amount of data written to the source LUN exceeds the preset upper limit value, and reset the increment accumulation variable to zero again; and
determine whether there is another operation of writing to the source LUN on determining that the total amount of data written to the source LUN does not exceed the preset upper limit value.

7. The apparatus for automatic snapshot according to claim 6, wherein the processor is further configured to:
generate a mapping table for storing locations where actual snapshot data is stored, wherein a pointer of the mapping table points to the source LUN.

8. The apparatus for automatic snapshot according to claim 7, wherein the processor is configured to:
copy all data blocks involved in the writing operation to the source LUN to a resource LUN;
modify the pointer involved in the writing operation to the source LUN to point to first addresses of corresponding data blocks stored in the resource LUN; and
write all the data involved in the writing operation to the source LUN into locations corresponding to the source LUN.

9. The apparatus for automatic snapshot according to claim 8, wherein the processor is configured to:
read data from the source LUN and the resource LUN according to pointer information in the mapping table when the snapshot is read.

10. A non-transitory computer-readable storage medium comprising instructions that, when executed, cause a processor to implement:
resetting an increment accumulation variable which indicates a total amount of data written to a source Logical Unit Number (LUN), to zero;
after resetting the increment accumulation variable to zero, determining whether there is an operation of writing to the source LUN;
obtaining an amount of data which is written to the source LUN in the operation if the operation of writing to the source LUN is determined, wherein the amount of the data is a value indicating the number of bytes of the data which is written to the source LUN in the operation;
accumulating the number of bytes of the data which is written to the source LUN in the operation for the increment accumulation variable;
obtaining the total amount of data written to the source LUN;
determining whether the total amount of data written to the source LUN exceeds a preset upper limit value;
taking a snapshot upon determining that the total amount of data written to the source LUN exceeds the preset upper limit value, and reset the increment accumulation variable to zero again; and
determining whether there is another operation of writing to the source LUN on determining that the total amount of data written to the source LUN does not exceed the preset upper limit value.

11. The non-transitory computer-readable storage medium according to claim 10, further comprising instructions that, when executed, cause the processor to implement:

presetting the upper limit value of data written to the source LUN.

12. The non-transitory computer-readable storage medium according to claim 10, further comprising instructions that, when executed, cause the processor to implement:

generating a mapping table for storing locations where actual snapshot data is stored, wherein a pointer of the mapping table points to the source LUN.

13. The non-transitory computer-readable storage medium according to claim 12, wherein taking the snapshot comprises:

copying all data blocks involved in the writing operation to the source LUN to a resource LUN;

modifying the pointer involved in the writing operation to the source LUN to point to first addresses of corresponding data blocks stored in the resource LUN; and writing all the data involved in the writing operation to the source LUN into locations corresponding to the source LUN.

14. The non-transitory computer-readable storage medium according to claim 13, further comprising instructions that, when executed, cause the processor to implement:

reading data from the source LUN and the resource LUN according to pointer information in the mapping table when the snapshot is read.

* * * * *